United States Patent [19]

Wald

[11] Patent Number: 4,869,044
[45] Date of Patent: Sep. 26, 1989

[54] METHOD FOR APPLYING HEATED ROOFING PAPER

[76] Inventor: Richard D. Wald, 2326 Rutgers Dr., Costa Mesa, Calif. 92626

[21] Appl. No.: 276,129

[22] Filed: Nov. 25, 1988

Related U.S. Application Data

[62] Division of Ser. No. 165,258, Mar. 7, 1988, Pat. No. 4,806,194.

[51] Int. Cl.$^4$ .......................... E04G 21/00; E04D 5/00
[52] U.S. Cl. ..................................... 52/746; 156/379.8; 156/577
[58] Field of Search ............... 52/746, 747; 156/379.8, 156/577, 579; 126/271.2 A, 271.2 C

[56] References Cited

U.S. PATENT DOCUMENTS

| | | | |
|---|---|---|---|
| 2,990,755 | 7/1961 | Caufield | 126/271.2 R |
| 4,547,152 | 10/1985 | Svendsen | 126/271.2 A |
| 4,588,458 | 5/1986 | Previsani | 52/746 |
| 4,725,328 | 2/1988 | Arnold | 52/746 |
| 4,761,201 | 8/1988 | Nichols, Jr. | 156/577 |

OTHER PUBLICATIONS

Hot Shot Roofing Torches: United Construction Products, Jun. 1984, 4 pp.
Roofing Torches & Equipment: Flame Engineering, Inc., Catalog 1085, 1985, 20 pp.

Primary Examiner—David A. Scherbel
Assistant Examiner—Caroline D. Dennison
Attorney, Agent, or Firm—Singer & Singer

[57] ABSTRACT

A method is described for applying roofing paper to a roof by first heating the roofing paper before the paper is applied to the roof, and then applying the heated roofing paper to the roof for final assembly. The applicator consists of a flat table bed and a cradle at one end for holding a roll of roofing paper and a handle at the other end for pulling the applicator. Located on the flat table is a plurality of infrared heaters that form an oven over the flat table and which are pivotally attached to the handle for allowing the roofing paper to pass over the table and through the oven. The paper is drawn from the roll through the oven and under a pair of rollers that support the applicator.

4 Claims, 3 Drawing Sheets

METHOD FOR APPLYING HEATED ROOFING PAPER

This is a divisional application of my prior application Ser. No. 07/165,258 which has been allowed as Pat. No. 4,806,194.

There is described a new and novel applicator for applying heated roofing paper to a roof and more particularly to an applicator that does not use an open flame, is safe to use, produces uniform results, and is more efficient than present day roofing paper applicators.

In the art as practiced today, roofing paper is placed on the roof in a rolled position and then an open flame usually fed by a butane heater is directed against the roll of roofing paper as it rests on the roof in order to cause the roofing paper to be heated so as to melt and flow as the roll of roofing paper is unrolled.

In one kind of installation a peg-board type board is laid on the roof and the asphalt roofing paper is directly heated by an open flame which allows the asphalt on the paper to melt and flow into the tiny holes on the peg-board as the roofing paper is unrolled thereby creating a bond between the paper and the board. The intense heat needed to melt the asphalt paper must approximate at least 1400 degrees and extreme care is necessary to prevent fires and damage to the roof as the paper is heated.

In one installation, the open flame is directed to the junction of the paper and the roof in order to preheat the roof and the paper and in this way obtain a good flow of the asphalt and a bonding of the paper to the roof. Unfortunately, too much heat can cause a fire in the rafters and too little heat will prevent sufficient bonding between the asphalt and the roof.

Typical open flame applicators are manufactured by Flame Engineering, Inc. of La Crosse, Kansas, and is described in their catalog, number 1085 and specifically on page 6.

Other roofing systems requiring an open torch to direct the heat against the asphalt paper are described in catalogs issued by the Beh Steve Corporation of Fresno, Calif.

In all these prior art systems, an open flame must be used to obtain the necessary heat to cause the asphalt to flow, otherwise the paper will not stick to the roof and an improper and leaky roof will result.

It is quite obvious that handling an open flame on the roof with the heat directed to the roof and the paper is a dangerous procedure requiring great care and skill to prevent injury to the workman and to prevent danger and fire to the roof itself. The prior art has recognized these problems and has developed different kinds of open flame applicators that are intended to be more efficient and safer to handle by building guards around the open flame in an effort to control the flame and improve safety.

Reference is now made to U.S. Pat. No. 2,990,755 issued to E. C. Caufield which describes a heated asphalt roller device for applying roofing paper to a roof. Caufield recognizes the danger of an open flame and proposes to first heat the roller itself and then apply the heated roller to the roof to melt the asphalt and thereby obtain cohesion between the paper and the roof. This system unfortunately has not been successful due to the amount of heat needed to heat the roller.

U.S. Pat. No. 4,547,152 issued to Svendsen discloses an improved device for applying an open flame to the roofing paper. The disclosed device contains the open flame in a protected area and the geometry of the device attempts to maintain the flame directly at the paper and away from the roof. Unfortunately, the device moves on a pair of wheels and the angle of the direction of the flame is variable thereby allowing the flame to contact the roof and or the paper and while the device does confine the open flame to a small area, the open flame is still there with all the attended dangers associated with an open flame on the roof.

The United Construction Products, Inc. of Denver, Colo., discloses still another improved open flame technique in their catalog identified as June 1984 H5-5-5. Here again, roofing paper is layered on the roof and the open flame is directed to the junction of the paper and the roof in an effort to uniformly heat the paper as it is rolled over the roof. The same brochure also describes mechanical devices having a plurality of open flames directed against the paper for heating the paper and applying the paper to the roof.

In the present invention, all open flames are eliminated, and instead an infrared burner is used in connection with a flat table top that allows the paper to be heated before it is applied to the roof. In addition, the roofing paper is heated in an oven area between the burner and the flat table thereby allowing a more uniform heat to be applied to the paper then can be applied by a single or even a plurality of open flames.

The complete applicator consists of a cart having a flat table bed and a cradle at one end for holding a roll of roofing paper.

A handle is located on the other end and in the preferred embodiment a plurality of infrared heaters is pivotally attached to the handle to allow the ovens to be pivoted away from the flat table in a first position or to be placed against the flat table in a second position so as to form an oven area over the table bed. The roofing paper is adapted to be moved from the cradle through the oven area where it is heated. A pair of rollers is located under the table bed with one roller located under the handle portion and the other roller located under the cradle portion thereby allowing the roofing paper to pass through the oven where it is heated and over and under the roller located under the handle portion where it contacts the roof and under the second roller which helps adhere the heated paper to the roof. The applicator is pulled over the roof for dispensing the heated paper directly to the roof.

The present invention eliminates all open flames making the application of the heated roofing paper safer and more efficient. The use of an oven area between the infrared heaters and the flat table bed forms a very efficient oven area where the paper is heated uniformly and in a manner that cannot be approached by the prior art. The weight of the complete assembly consisting of the oven, the table, the roll of roofing paper, and the handle when pulled over the paper being applied to the roof helps set the paper onto the roof thereby improving the bonding of the roofing paper to the roof.

It will be appreciated by those skilled in the art that in the present invention the roofing paper is heated first before application of the paper to the roof and only the heated paper is applied to the roof as opposed to the prior art devices where the paper is place in contact with the roof and then heat is applied to both the roof and the paper. Heating the paper first and then applying it to the roof allows a more uniform heated paper to be more efficiently applied and in a safer environment.

Further objects and advantages will made more apparent by referring now to the accompanying drawings wherein.

Figure 1:
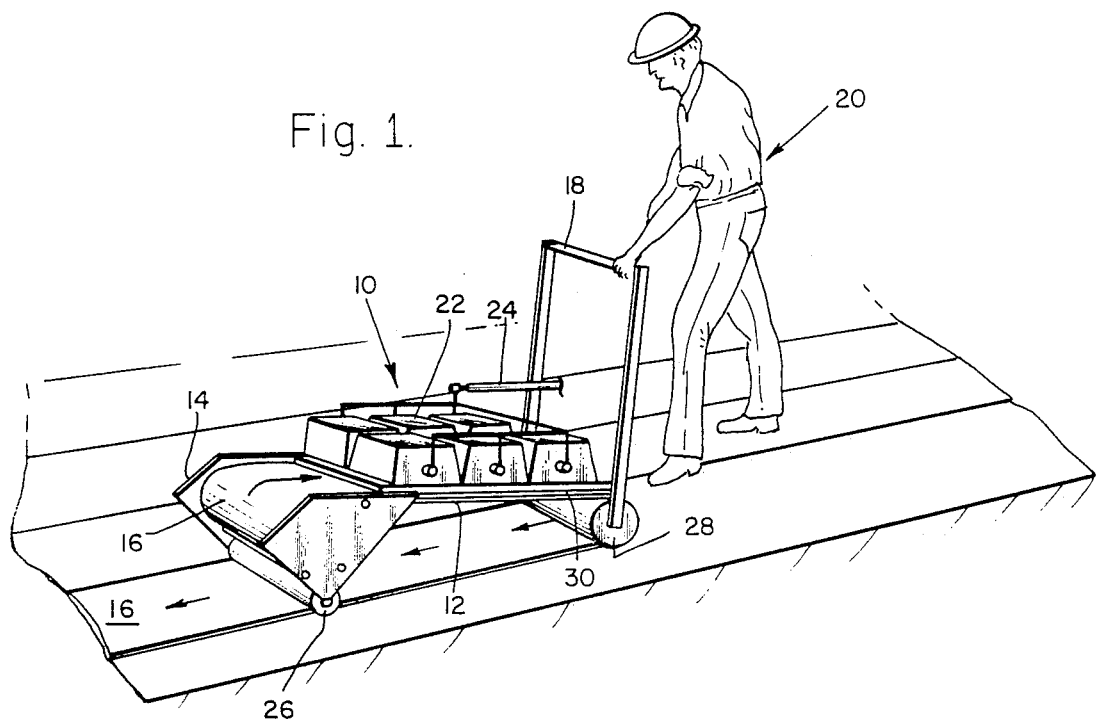
FIG. 1 illustrates the applicator being used to apply heated roofing paper to a roof.

Referring now to FIG. 1 there is shown a perspective view of the applicator 10 used to apply a roll of roofing paper onto a roof. The applicator 10 consists of a substantially flat table 12 having a cradle 14 at one end adapted to hold a roll of roofing paper 16 and a handle 18 at the other end. FIG. 1 illustrates a workman 20 holding handle 18 and pulling the applicator 10 as the roll of roofing paper 16 is unrolled.

Located over the flat bed 12 i a plurality of infrared burners 22 that are all connected together and fed by a single propane line 24. Located under the cradle portion 14 is a roller 26 and located under the handle portion 18 is another roller 28.

The plurality of infrared ovens 22 are maintained in a spaced apart relationship with respect to the table 12 by means of angle irons 30 located on each side of the table bed 12. The oven assembly 22 is pivotally attached to the handle 18 in order to raise the burner assembly 22 away from the table bed 12. This is more fully shown in connection with FIG. 5.

In operation, a roll of roofing paper 16 is located within the cradle 14 and the paper is fed through the oven portion of the infrared heaters 22 formed by the heaters and table bed 12 and pulled around roller 28 and under roller 26. The workman 20 when pulling on the handle 18 forces the roofing paper to e ejected from the roll 16 where it is heated by the oven and then laid on the roof as rollers 28 and 26 place their weight on the heated paper.

Figure 2:
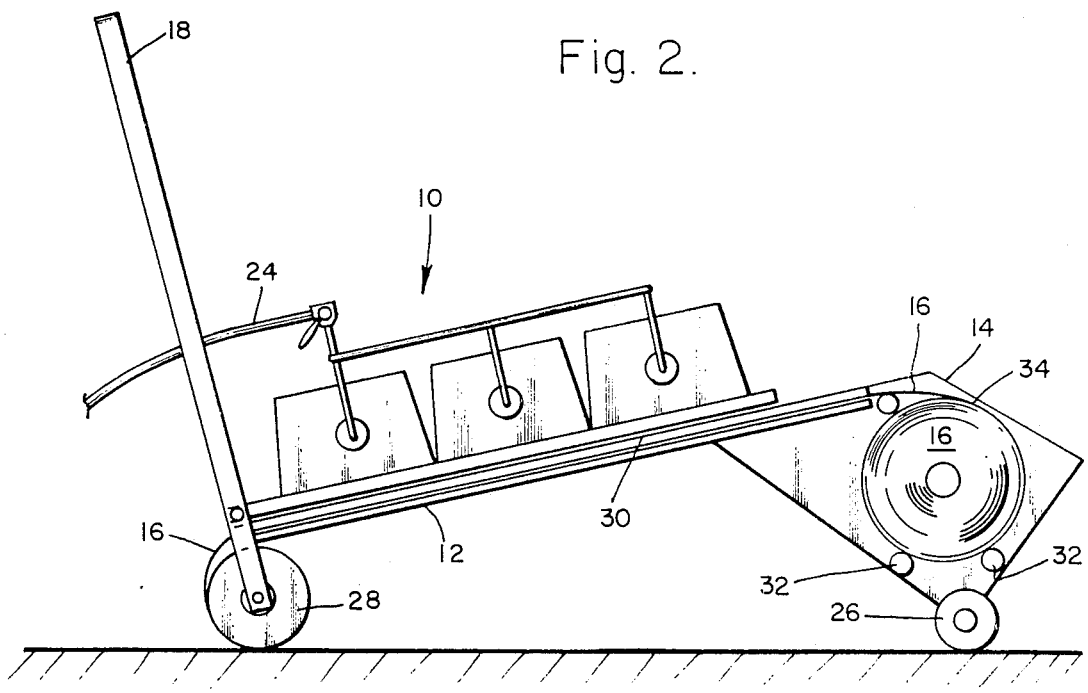
FIG. 2 is a side view of the applicator showing the infrared ovens in the closed position.

Referring now to FIG. 2 there is shown a side view of the applicator 10 and which more fully illustrates how the roll of roofing paper 16 is located on a pair of rollers 32 thereby allowing the roll of roofing paper 16 to freely rotate and discharge the paper from the roll. In the preferred embodiment, the diameter of the roll of roofing paper 16 is chosen so that the highest point indicated to be 34 is no higher than the table 12 thereby insuring that the paper will flow smoothly and evenly over the table 12 and through the oven area below the infrared burners 22 and the table bed. The angle iron 30 serves the dual purpose of maintaining the base of the burners 22 in a spaced apart relationship away from the table bed thereby forming an oven area through which the roofing paper 16 can freely pass. The ovens 22 are capable of uniformly heating the paper 16 since the angle irons 30 not only define the oven area, but also protect the oven area from wind, or other disturbances in the atmosphere from effecting the oven area between the heaters 22 and the table 12. In this way the oven area is undisturbed, very efficient, and uniformly heats the paper 16 as it passes through.

In operation, the paper 16 exits between the handle 18 and rolls under roller 28 where it contacts the roof. As the applicator 10 is pulled over the roof, roller 26 helps seal the paper 16 to the roof itself.

Figure 3:
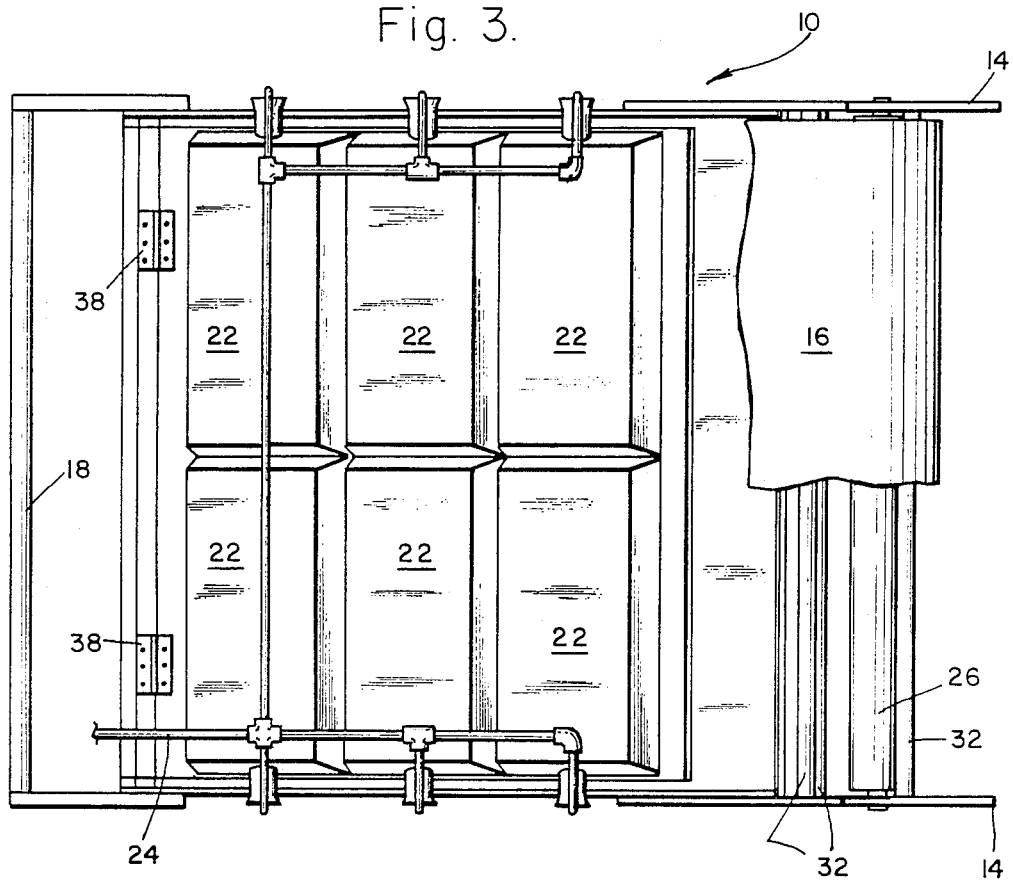
FIG. 3 is a top view of the applicator with the oven shown in the closed position;.

Referring now to FIG. 3 there is shown a top view of the applicator 10 in which illustrates hinges 38 that allow the plurality of burners 22 to be pivotally attached to the frame portion from the handle 18. The hinges 38 allow the complete burner assembly to be pulled up and away from the flat bed 12 thereby allowing inspection of the device and allowing the operator to move the paper 16 over the bed prior to heating the paper and applying the paper to the roof.

Figure 4:
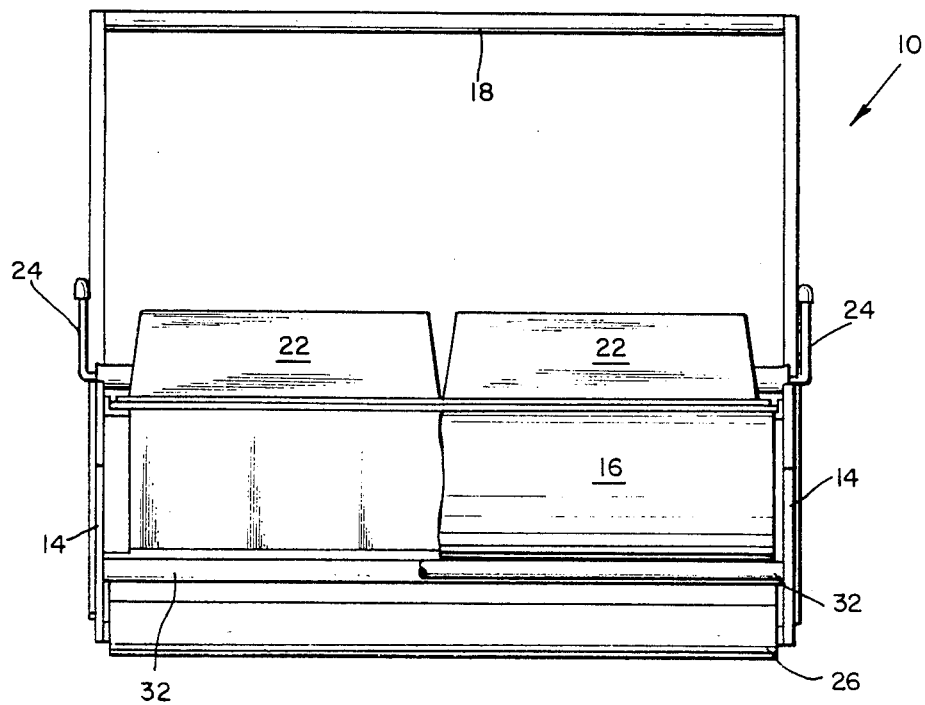
FIG. 4 is rear view of the applicator viewed from the handle portion end.

Referring now to FIG. 4 there is shown a front view of the applicator 10 more fully illustrating roller 26 and the fact that the full weight of the roll of paper 16 sits over the roller 26 thereby insuring good adhesion between the heated paper and the roof.

Figure 5:
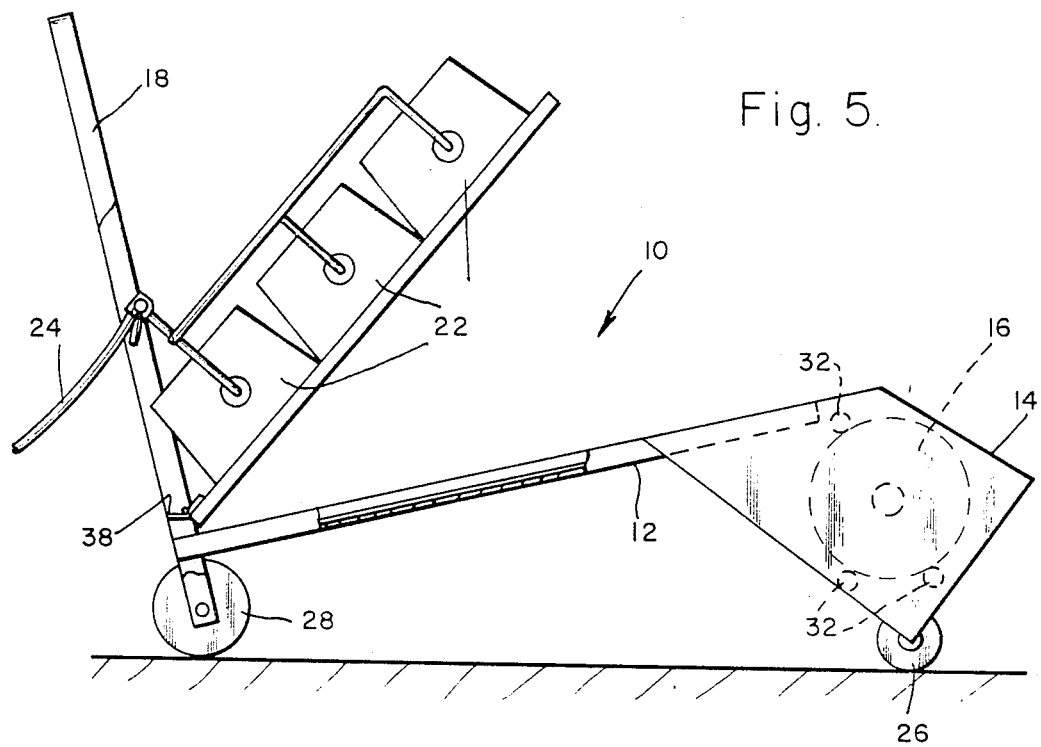
FIG. 5 is a side view of the applicator showing the infrared ovens in a raised open position away from the table bed.

Referring now to FIG. 5 there is shown a side view of the applicator 10 illustrating the burners 22 held in an open position by means of hinges 38. In this position the roofing paper 36 can be fed along the table 12 and around the roller 28 prior to the application of heat from the oven 22.

The applicator 10 provides a very safe means of heating the paper 16 and without applying any direct heat to the roof itself as in the prior art systems. In addition, the elimination of the open flame and the creation of an oven area through which the paper 16 must pass insures that the paper will be uniformly heated prior to it being applied to the roof.

Because of the geometry of the device, it will be apparent that the starting point of applying the heated paper at any place on the roof will prevent the heated paper from being applied to the roof as determined by the distance between rollers 26 and 28. As the applicator 10 is pulled, the heated paper will be applied to the roof, but at a point that will always be less than the distance between rollers 26 and 28. The applicator 10 will allow paper to be applied right to the edge of the roof; however, the starting point will always contain that missing length of paper.

Figure 6:
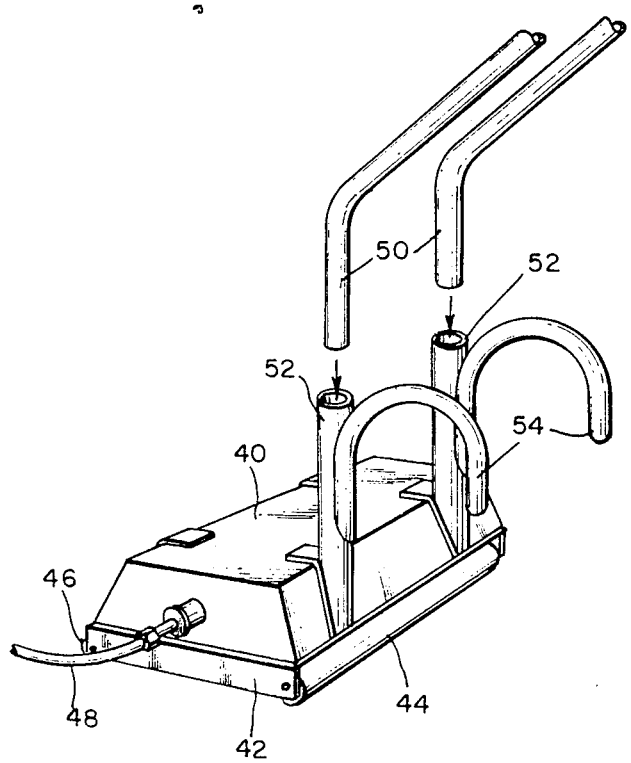
FIG. 6 shows a portable applicator for heating small portions of roofing paper.

Referring now to FIG. 6 there is shown a hand applicator consisting of a single infrared heater 40 having a bracket 42 at each end which contains a pair of rollers 44 and 46 connected to said brackets 42. A propane gas supply hose 48 feeds the oven 40 to supply the necessary fuel. The bracket 42 and rollers 44 and 46 provide an oven area between the heater 40 and the roof. The single oven 40 may be applied to the roof by means of suitable handles 50 which are capable of being inserted within receptacle 52 and in this way allow an operator to move the heater 40 while in an upright position. Curved handles 54 are provided to allow the workman to work in corners or in small areas where the complete applicator 10 cannot function, and in this way allow individual areas to be serviced and again without the need of utilizing an open flame as is so necessary in the prior art devices.

The present invention eliminates hot spots in the heating of the roofing material, is not effected by wind, provide uniform application of heat, eliminates the need of an open flame, is more efficient, and is inherently safe both to the structure and to the operator.

I claim:

1. A method for first heating and then applying the heated roofing paper to a roof comprising the steps of;
   first unravel the unheated roofing paper in a spaced apart relationship with respect to the roof to be heated;
   then pass the unheated roofing paper through an oven area where the roofing paper is heated before the paper touches the roof; and
   then apply the heated roofing paper to the roof.

2. A method for fist heating and then applying the heated roofing paper to a roof comprising the following steps:
   unraveling the unheated roofing paper in a spaced apart relationship with respect to the roof to be heated;
   passing the unheated roofing paper through an oven to heat the paper before applying the heated paper to the roof;
   moving the unheated roll of roofing paper and the heating oven by a movable cart; and
   then applying the heated roofing paper to the roof by pulling the cart over the heated roofing paper and using the weight of the cart to apply the heated paper to the roof.

3. A method for first heating and then applying the heated roofing paper to a roof comprising the steps of;
   providing a substantially flat table bed for accepting roofing paper to be heated;
   placing a plurality of burners in a spaced apart relationship above the table bed to form an oven area;
   passing the roofing paper between the flat table bed and the plurality of burners whereby the roofing paper passes unrestricted through the oven area; and
   pulling the roofing paper through the oven area and around a pair of rollers located on the bottommost portion of the table whereby the heated roofing paper is applied to the roof.

4. A method according to claim 3 in which the unheated roofing paper is first passed through the oven area to be heated and the heated roofing paper is then applied to the roof.

* * * * *